US010844969B2

(12) United States Patent
Rosko et al.

(10) Patent No.: US 10,844,969 B2
(45) Date of Patent: Nov. 24, 2020

(54) FAUCET INCLUDING A ROTATABLE SPOUT ARM

(71) Applicant: Delta Faucet Company, Indianapolis, IN (US)

(72) Inventors: Michael Scot Rosko, Greenwood, IN (US); Thad J. Eads, Urbana, IN (US)

(73) Assignee: Delta Faucet Company, Indianapolis, IN (US)

( * ) Notice: Subject to any disclaimer, the term of this patent is extended or adjusted under 35 U.S.C. 154(b) by 150 days.

(21) Appl. No.: 16/235,421

(22) Filed: Dec. 28, 2018

(65) Prior Publication Data

US 2020/0208752 A1   Jul. 2, 2020

(51) Int. Cl.
*F16K 11/00* (2006.01)
*E03C 1/04* (2006.01)

(52) U.S. Cl.
CPC .......... *F16K 19/006* (2013.01); *E03C 1/0404* (2013.01); *Y10T 137/9464* (2015.04)

(58) Field of Classification Search
CPC ........................ Y10T 137/9464; E03C 1/0404; F16K 19/006
See application file for complete search history.

(56) References Cited

U.S. PATENT DOCUMENTS

| | | |
|---|---|---|
| 2,367,809 A | 1/1945 | Stein et al. |
| 3,034,536 A | 5/1962 | Kennison |
| 3,448,768 A | 6/1969 | Keller |
| D304,225 S | 10/1989 | Lathrop |
| 4,884,596 A | 12/1989 | Byers et al. |
| 4,889,165 A | 12/1989 | Newcombe |
| 4,894,874 A | 1/1990 | Wilson |
| 4,946,135 A | 8/1990 | Yang |
| 5,579,808 A | 12/1996 | Mikol et al. |
| 6,817,379 B2 | 11/2004 | Perla |
| 6,832,032 B2 | 12/2004 | Simmons et al. |
| 6,926,035 B2 | 8/2005 | Ozagir |
| 7,445,024 B2 | 11/2008 | Paterson et al. |
| 7,766,043 B2 | 8/2010 | Thomas |
| 8,061,142 B2 | 11/2011 | Kastrup et al. |
| 8,739,826 B2 | 6/2014 | Thomas |
| 8,820,705 B2 | 9/2014 | Davidson et al. |
| D731,042 S | 6/2015 | Fritz |
| 9,096,002 B2 | 8/2015 | Seman, Sr. |
| D737,941 S | 9/2015 | Eads |
| D751,173 S | 3/2016 | Bahler |
| D751,667 S | 3/2016 | Bahler |
| D757,912 S | 5/2016 | Eads |
| D759,205 S | 6/2016 | Eads |
| D759,212 S | 6/2016 | Eads |

(Continued)

FOREIGN PATENT DOCUMENTS

| | | |
|---|---|---|
| CN | 201483841 | 5/2010 |
| CN | 104191520 | 1/2017 |

(Continued)

*Primary Examiner* — Marina A Tietjen
*Assistant Examiner* — Frederick D Soski
(74) *Attorney, Agent, or Firm* — Faegre Drinker Biddle & Reath LLP

(57) ABSTRACT

A faucet assembly including a spout arm supported by a spout hub and configured to rotate about a vertical axis. In an illustrative embodiment, the faucet assembly is formed through additive manufacturing.

26 Claims, 9 Drawing Sheets

(56) References Cited

U.S. PATENT DOCUMENTS

| | | |
|---|---|---|
| D767,725 S | 9/2016 | Eads |
| D769,419 S | 10/2016 | Eads |
| 9,573,191 B2 | 2/2017 | Jagtap et al. |
| 9,671,259 B2 | 6/2017 | Potter |
| 9,695,579 B2 | 7/2017 | Herbert et al. |
| D798,420 S | 9/2017 | Eads |
| 2003/0183275 A1 | 10/2003 | Yang |
| 2005/0103389 A1 | 5/2005 | Wei |
| 2005/0223490 A1* | 10/2005 | Kunkel .................. F21S 8/00 4/675 |
| 2006/0117476 A1* | 6/2006 | Kunkel ................ E03C 1/0404 4/675 |
| 2006/0118188 A1 | 6/2006 | Hsu |
| 2006/0144442 A1* | 7/2006 | Lehner ............... F16L 27/0849 137/315.01 |
| 2006/0254650 A1 | 11/2006 | Wu et al. |
| 2006/0266424 A1 | 11/2006 | Filtness |
| 2007/0232108 A1* | 10/2007 | Miura .................... E03C 1/042 439/310 |
| 2008/0277927 A1* | 11/2008 | Mueller ............... E03C 1/0404 285/272 |
| 2009/0016156 A1 | 1/2009 | Wu et al. |
| 2009/0242671 A1* | 10/2009 | Erickson ............. E03C 1/0404 239/589 |
| 2009/0266433 A1 | 10/2009 | Liang |
| 2011/0289676 A1* | 12/2011 | Lin ...................... E03C 1/0404 4/675 |
| 2012/0067437 A1 | 3/2012 | Xia |
| 2012/0085446 A1* | 4/2012 | Lin ...................... E03C 1/0404 137/801 |
| 2013/0019974 A1* | 1/2013 | Laera .................. E03C 1/0404 137/801 |
| 2013/0174932 A1 | 7/2013 | Hou |
| 2013/0340162 A1* | 12/2013 | Peel ....................... E03B 7/006 4/676 |
| 2014/0015246 A1* | 1/2014 | Erickson ................. E03C 1/04 285/184 |
| 2014/0130250 A1* | 5/2014 | Courtney ............... A47K 10/48 4/638 |
| 2015/0308088 A1* | 10/2015 | Enlow .................. E03C 1/0404 137/1 |
| 2016/0069051 A1 | 3/2016 | McHale et al. |
| 2016/0102682 A1 | 4/2016 | Gass et al. |
| 2016/0215482 A1* | 7/2016 | Fourman ............. E03C 1/0404 |
| 2016/0236212 A1* | 8/2016 | Patton ................. E03C 1/0409 |
| 2016/0243621 A1 | 8/2016 | Lucas et al. |
| 2016/0280197 A1 | 9/2016 | Mayr et al. |
| 2016/0340879 A1 | 11/2016 | Chen |
| 2016/0348913 A1 | 12/2016 | Ott et al. |
| 2017/0065147 A1 | 3/2017 | Boyer |
| 2017/0159447 A1 | 6/2017 | Clum et al. |
| 2017/0182503 A1 | 6/2017 | Moehring et al. |
| 2017/0285670 A1* | 10/2017 | Pirutin ................ E03C 1/0404 |
| 2017/0350104 A1* | 12/2017 | Clarke ................ E03C 1/0404 |
| 2017/0350516 A1* | 12/2017 | Wang .................... F16K 5/0457 |
| 2017/0356173 A1* | 12/2017 | Loberger ................ A47K 5/12 |
| 2018/0030700 A1* | 2/2018 | Zindler ................. E03C 1/057 |
| 2018/0135280 A1* | 5/2018 | Nagaiwa ............... E03C 1/057 |
| 2018/0328010 A1* | 11/2018 | Faiola ................... A23N 12/02 |
| 2019/0055721 A1* | 2/2019 | Dieterle .............. E03C 1/0404 |
| 2019/0078305 A1* | 3/2019 | Lin ..................... E03C 1/0404 |
| 2020/0048879 A1* | 2/2020 | Hadfield ............. E03C 1/0404 |
| 2020/0208383 A1 | 7/2020 | Rosko et al. |

FOREIGN PATENT DOCUMENTS

| | | |
|---|---|---|
| CN | 206052880 | 3/2017 |
| JP | 2005133481 | 5/2005 |
| JP | 3204438 | 6/2016 |
| KR | 200273548 | 4/2002 |
| WO | WO2015/154170 | 10/2015 |
| WO | WO2017/070232 | 4/2017 |

* cited by examiner

FAUCET INCLUDING A ROTATABLE SPOUT ARM

BACKGROUND AND SUMMARY OF THE DISCLOSURE

The present disclosure relates to faucets including spouts that may be moved to a plurality of alternate positions. More particularly, the present disclosure relates to a spout rotatable to a plurality of alternate positions while operational without interrupting the flow of water.

Aesthetic details and waterflow characteristics are factors often considered in the design of faucets. With the recent availability of additive manufacturing (e.g., three dimensional printing), new and useful designs can now be created than previously possible by traditional manufacturing processes.

In an illustrative embodiment of the present disclosure, a faucet assembly includes a mounting base, a first upright extending upwardly from the mounting base and including a first upright fluid channel having a first outlet and configured to be fluidly coupled to a first water source, and a cantilevered spout arm including an arm fluid channel and extending between a first end and a second end. The first end of the cantilevered spout arm is supported by the first upright, and the arm fluid channel includes a fluid outlet proximate the second end. A spout coupler includes an inlet providing fluid communication between the first upright fluid channel of the first upright and the arm fluid channel of the cantilevered arm. The cantilevered arm is supported for rotation relative to the first upright by the spout coupler.

According to another illustrative embodiment of the present disclosure, a faucet assembly includes a mounting base, a first upright extending upwardly from the mounting base and including a first upright fluid channel having a first outlet, and a second upright including a second upright fluid channel having a second outlet, the second upright being spaced apart from the first upright. A cantilevered spout arm includes an arm fluid channel and extends between a first end and a second end. The first end of the cantilevered spout arm is supported by the first upright and the second upright, and the arm fluid channel includes a fluid outlet proximate the second end. A spout coupler supports the cantilevered arm for rotation relative to the first upright and the second upright.

According to another illustrative embodiment of the present disclosure, a faucet assembly includes a mounting shank configured to be mounted to a sink deck, and a faucet body coupled to the mounting shank. The faucet body includes a spout hub including a support having a cylindrical wall defining a receiving opening with at least one outlet within the cylindrical wall, and a mounting base coupled to the mounting shank and the spout hub. At least one fluid channel is defined by the spout hub and is in fluid communication with the at least one outlet of the spout hub. A spout arm is operably coupled to the spout hub. A spout mount is rotatably coupled to the support of the spout hub. The spout mount includes an inlet configured to be in fluid communication with the at least one outlet of the spout hub. A fluid channel is defined by the spout arm and is fluidly coupled to the inlet of the spout mount. An outlet is defined by the spout arm and is fluidly coupled to the fluid channel of the spout arm. The spout arm is configured to rotate relative to the spout hub between a plurality of alternate positions.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the disclosure described herein are not intended to be exhaustive or to limit the disclosure to the precise forms disclosed. Rather, the embodiments described herein enable one skilled in the art to practice the disclosure.

Figure 1:
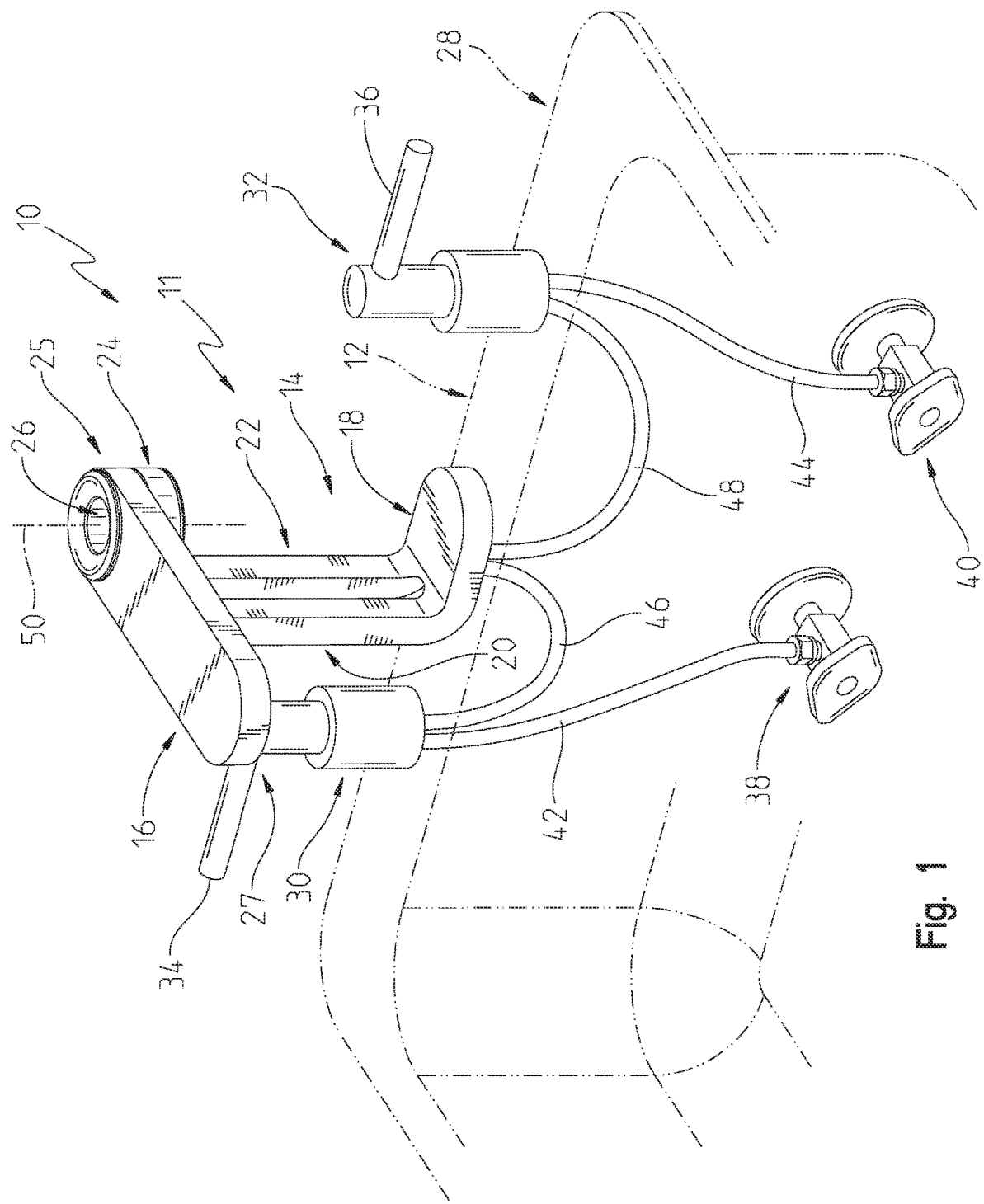
FIG. 1 is a perspective view of an illustrative faucet assembly of the present disclosure shown mounted to a sink deck.
Figure 3:
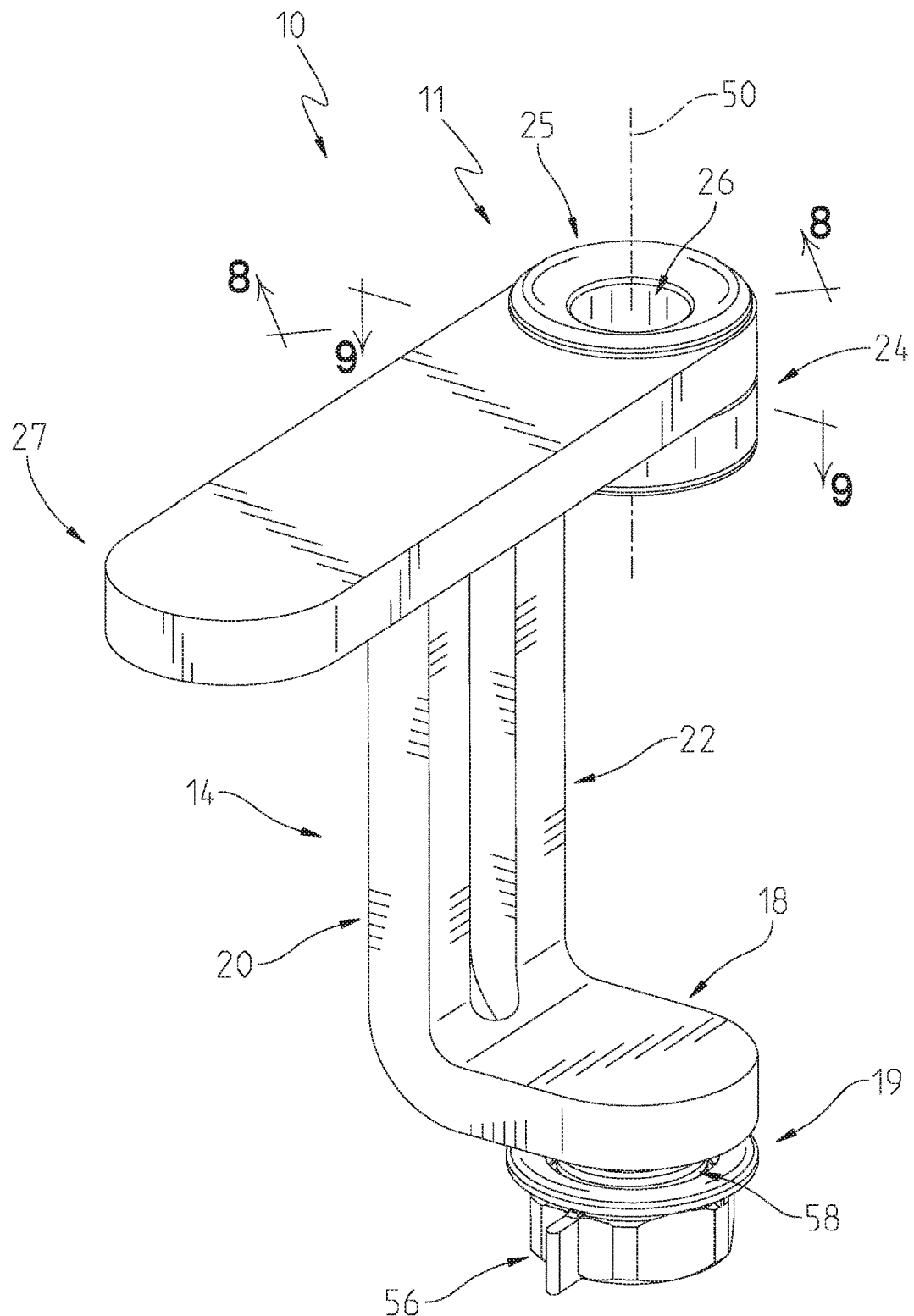
FIG. 3 is a top perspective view of the faucet assembly of FIG. 1.

Referring initially to FIG. 1, an illustrative faucet assembly 10 is shown coupled to mounting structure, such as a sink deck 12. The faucet assembly 10 illustratively includes a delivery spout 11 having a spout hub 14, a spout arm 16 coupled to the spout hub 14, and a deck coupler 19 (FIG. 3). The delivery spout 11 illustratively further includes a mounting base 18 supporting the spout hub 14. As further detailed herein, the deck coupler 19 is configured to secure the mounting base 18 of the delivery spout 11 to the sink deck 12.

Figure 6:
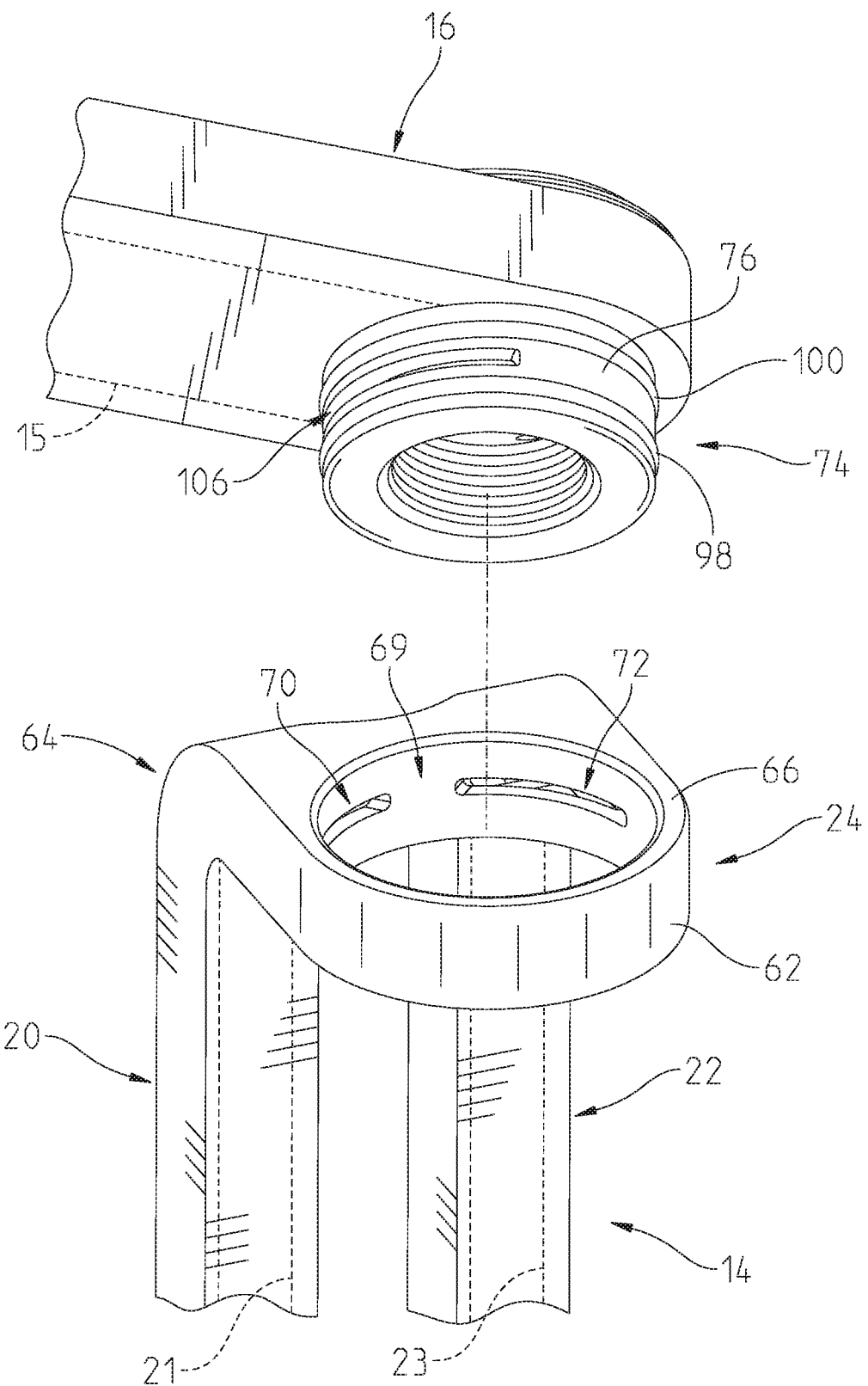
FIG. 6 is a perspective view of the faucet assembly of FIG. 1, showing the spout coupler between the spout arm and the spout hub.
Figure 7:
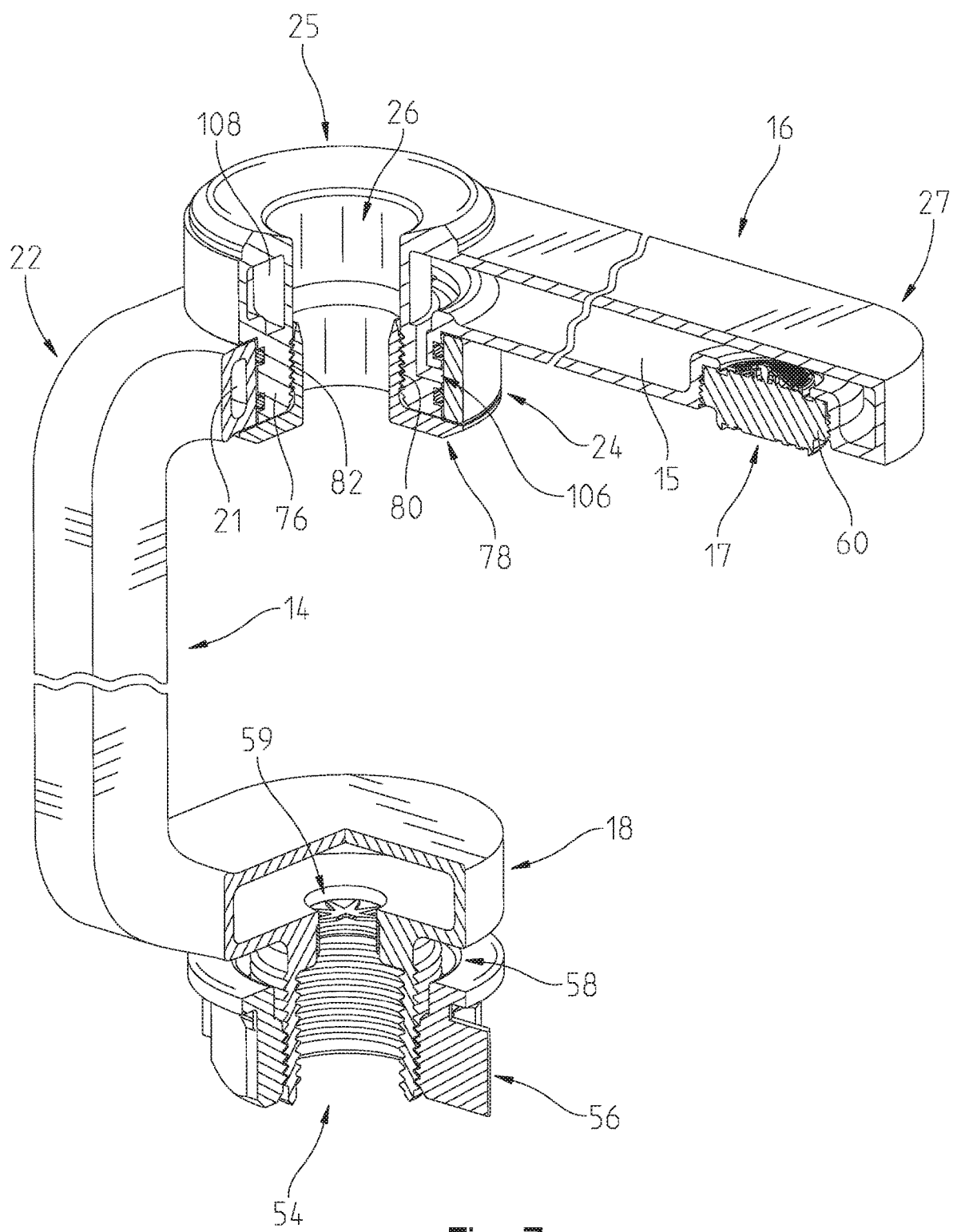
FIG. 7 is a perspective view, with a quadrant cross-section, of the faucet assembly of FIG. 1.
Figure 8:
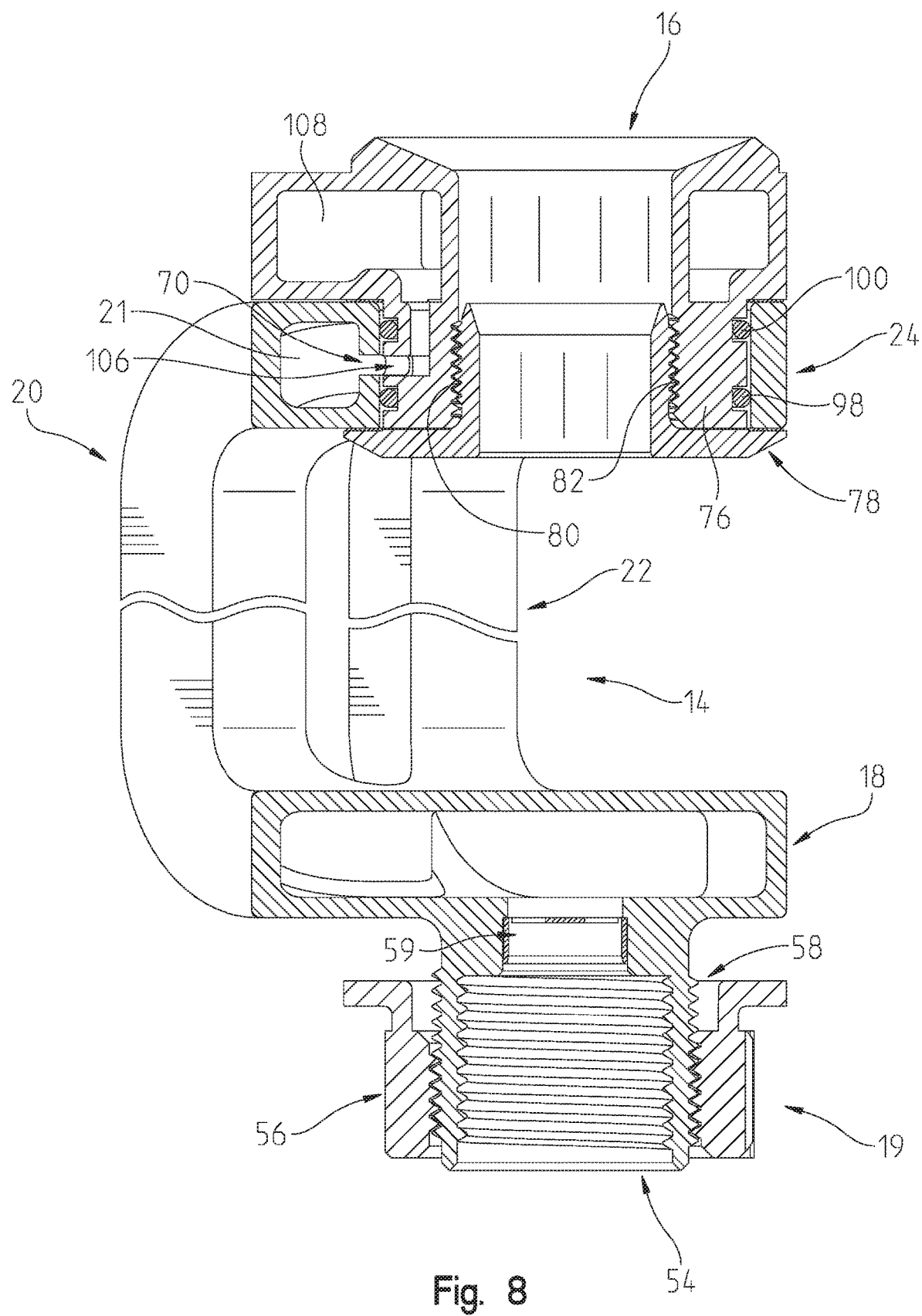
FIG. 8 is a cross-sectional view of the faucet assembly of FIG. 3 taken along line 8-8.

The spout hub 14 illustratively includes spaced apart first and second uprights 20 and 22 defining first and second upright fluid channels 21 and 23, respectively (FIG. 6). The spout arm 16 illustratively includes a fluid channel 15 configured to be in fluid communication with a fluid outlet 17, and with the first and second upright fluid channels 21 and 23 via a spout coupler 24 (FIGS. 6 and 7).

The spout coupler 24 and the spout arm 16 illustratively define a vertical opening 26 positioned directly above the mounting base 18. The spout arm 16 is illustratively a cantilevered arm extending from a first end 25 to a second end 27. The first end 25 of the spout arm 16 is supported by the spout hub 14, while the second end 27 of the spout arm 16 is spaced away from spout hub 14 for positioning the fluid outlet 17 over a basin, such as a tub or a sink 28. Illustratively, the spout arm 16 is fluidly coupled via the spout coupler 24 and the spout hub 14 to hot and cold water control valves 30 and 32 including handles 34 and 36.

In one illustrative embodiment, hot water control valve 30 controls the flow of hot water from a first or hot water source, such as a hot water stop 38, in response to rotation of handle 34, while cold water control valve 32 controls the flow of cold water from a second or cold water source, such as a cold water stop 40, in response to rotation of handle 36. More particularly, as handles 34 and 36 are rotated relative to the sink deck 12, the flow of water from valves 30 and 32 to delivery spout 11 increases or decreases until flow reaches a peak flow or completely stops, respectively. In other illustrative embodiments, control valves 30 and 32 may control other types of liquids including, for example, filtered or treated water. Further, in other illustrative embodiments, faucet assembly 10 may include only one handle to control valves 30 and 32, or faucet assembly 10 may include only one valve (e.g., a mixing valve). In yet other illustrative embodiments, the manual water control valves 30 and 32 may be replaced with one or more electrically operable valves.

Illustratively, flexible water conduits or tubes 42 and 44 fluidly couple water stops 38 and 40 to inlets of the water control valves 30 and 32, respectively. Similarly, flexible water conduits or tubes 46 and 48 may fluidly couple outlets of the water control valves 30 and 32 to the mounting base 18 of the delivery spout 11. In one illustrative embodiment, the tubes 46 and 48 may couple to an inlet 54 of a mounting shank 58, where the hot and cold water from the water stops 38 and 40 is mixed before flowing to the spout hub 14. In another illustrative embodiment, the tubes 46 and 48 may fluidly couple directly to the upright fluid channels 21 and 23 such that the hot and cold water remains separated until at least reaching the spout coupler 24. A flow regulator 59 may be supported by the mounting shank 58 and fluidly coupled to the tubes 42 and 44 (FIG. 5).

Figure 2:
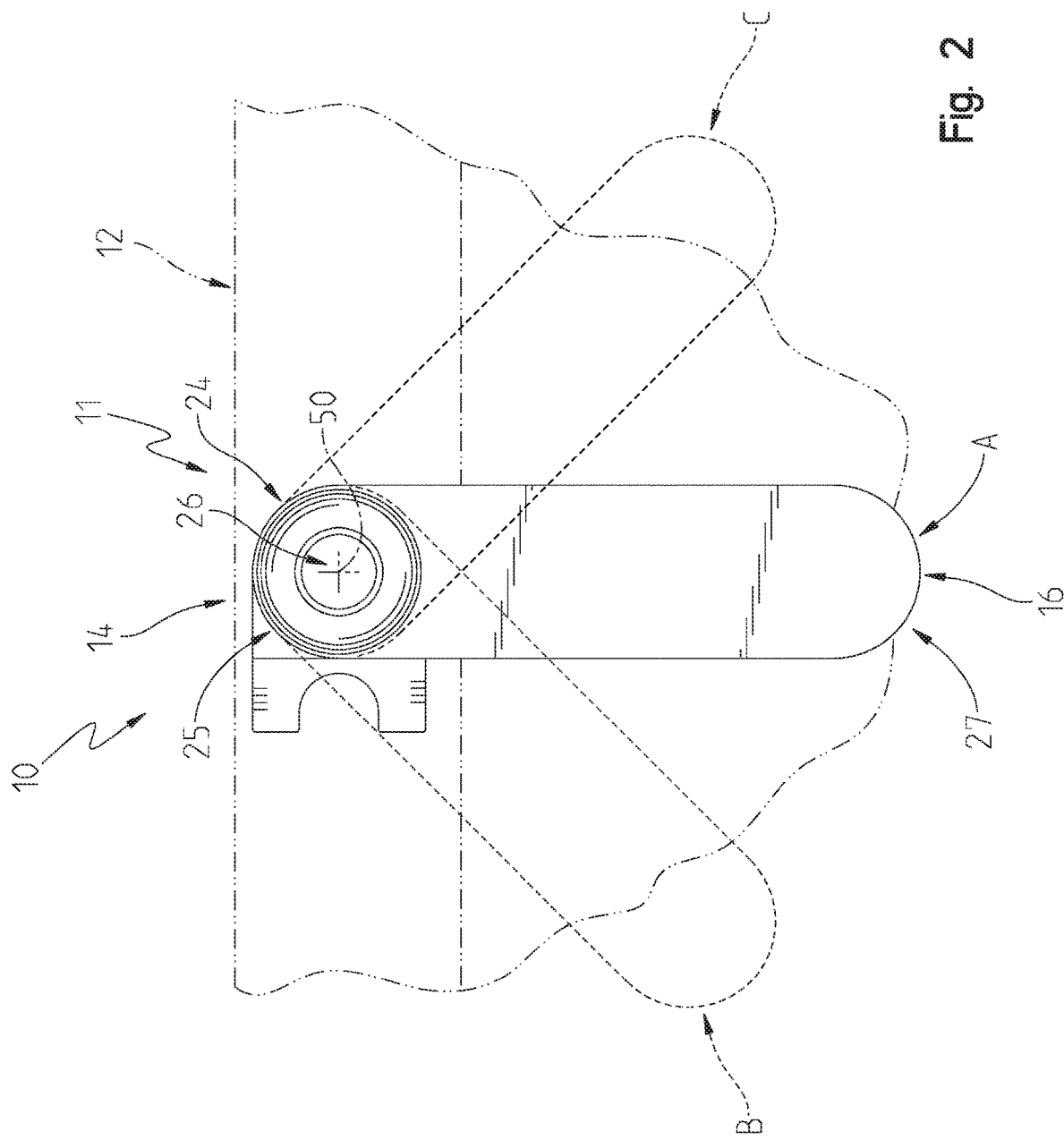
FIG. 2 is a top plan view of the faucet assembly of FIG. 1, with alternate positions of the spout arm shown in phantom.

Referring to FIG. 2, a top view of the spout arm 16 is shown. In an illustrative embodiment, the spout arm 16 is configured to move to alternate positions A, B and C, and any position between positions A, B and C by rotating relative to the spout hub 14 about a vertical axis 50. Illustratively, the axis 50 is defined by the opening 26 and extends parallel to spout hub 14. In alternate embodiments, spout arm 16 may reach these positions A, B and C via alternate movements or move beyond positions A, B and C to achieve mobility of 360 degrees, or any increment between 0 and 360 degrees. As shown in FIG. 2, the illustrative spout arm 16 is configured to rotate by 90 degrees between positions B and C, by 45 degrees between points A and B, and by 45 degrees between points A and C. In yet other embodiments, the spout arm 16 may rotate around an axis that is not parallel to the spout hub 14.

Figure 4:
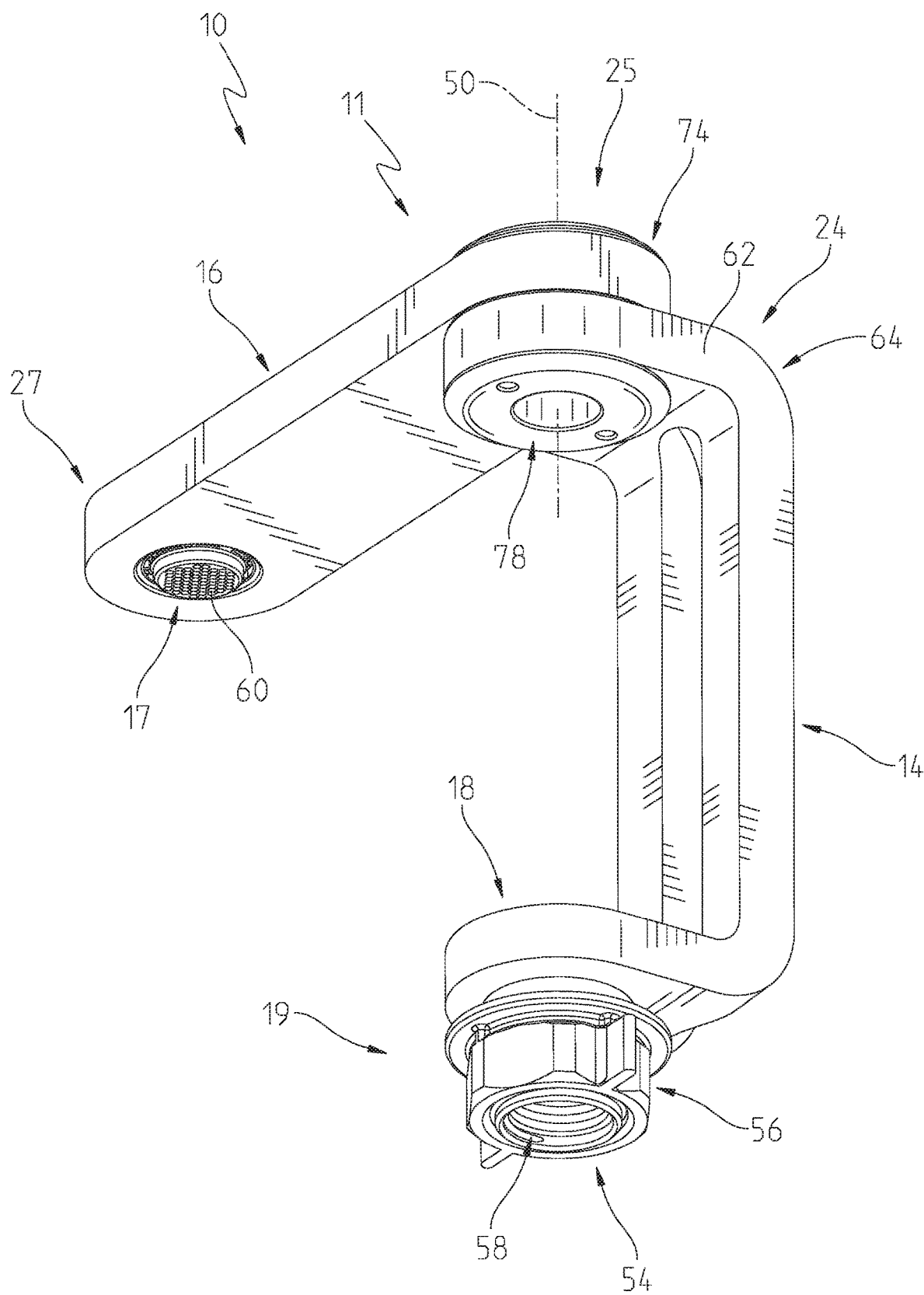
FIG. 4 is a bottom perspective of the faucet assembly of FIG. 3.

With reference to FIG. 3, the delivery spout 11 of faucet assembly 10 is illustratively coupled to the sink deck 12 (FIG. 1) via the deck coupler 19, including the mounting shank 58. In an illustrative embodiment, the mounting shank 58 is coupled to the mounting base 18 and extends parallel to, and in the opposite direction of, spout hub 14 (e.g., downwardly). In an alternate embodiment, the mounting shank 58 may extend along an axis that is not parallel to the spout hub 14. When mounted, the mounting shank 58 penetrates the sink deck 12 (FIG. 1) and may be fluidly coupled to valves 30 and 32 (FIG. 1) via tubes 46 and 48 extending through the shank inlet 54 (FIG. 4). The mounting shank 58 is illustratively secured to the sink deck 12 (FIG. 1) via a mounting nut 56 threadably engaging the mounting shank 58. More particularly, the mounting nut 56 and the mounting base 18 clamp the delivery spout 11 to the sink deck 12.

Figure 5:
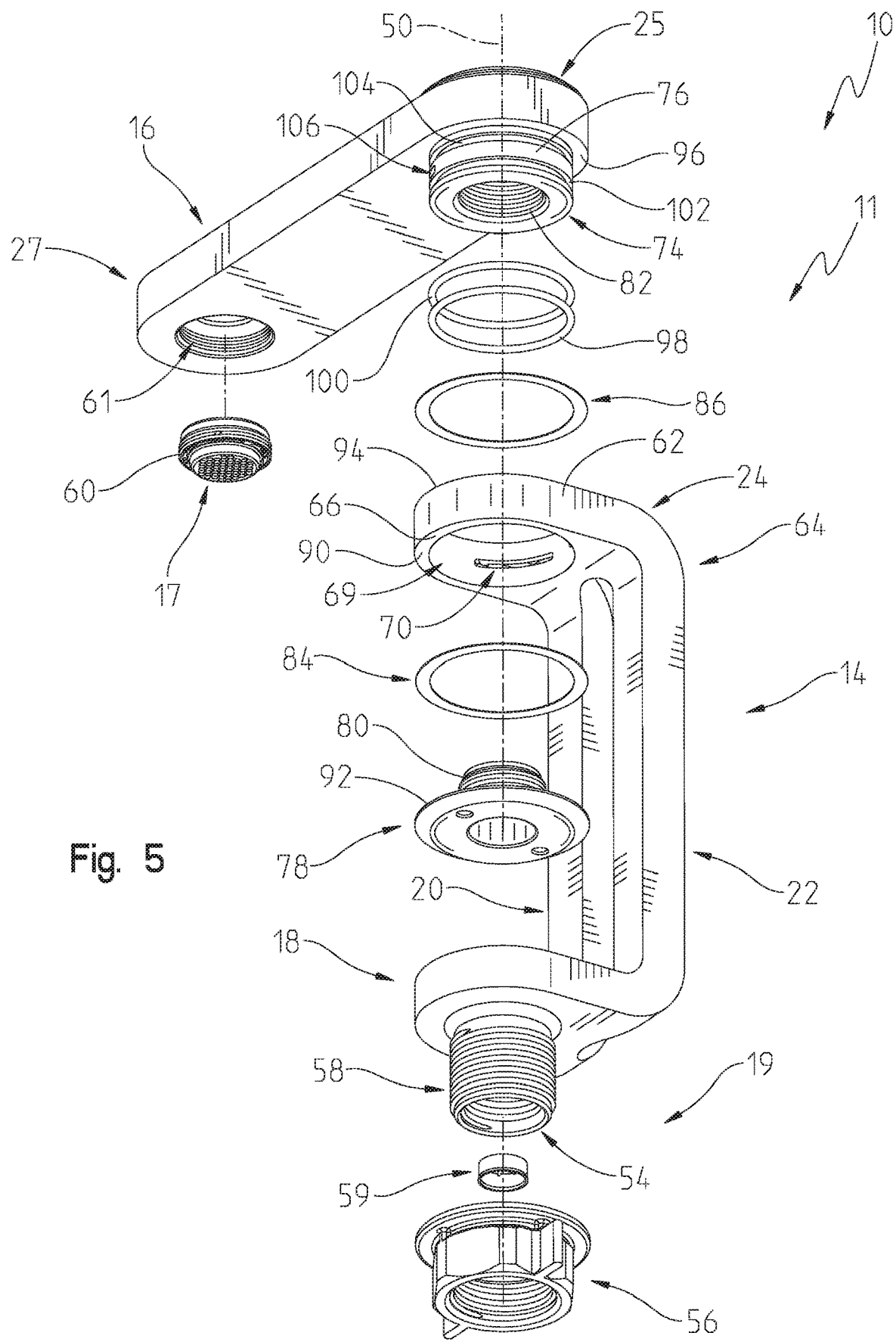
FIG. 5 is an exploded perspective view of the faucet assembly of FIG. 4.

Referring to FIGS. 4 and 5, the illustrative delivery spout 11 of faucet assembly 10 is shown from a bottom perspective. As shown, the spout arm 16 includes a flow device 60 defining the fluid outlet 17 and is located within an opening 61 of the spout arm 16 proximate the second end 27 (opposite of the spout hub 14). In an illustrative embodiment, the flow device 60 is an aerator, such that the flow of water exiting the flow device 60 is an aerated stream. Alternately, a laminar flow device can be used such that the flow of water exiting the flow device 60 is a laminar stream. In another embodiment, the spout arm 16 may not include a flow device 60 to allow the free flow of water from the spout arm 16. In an illustrative embodiment, the flow device 60 is threadably secured to the spout arm 16.

With reference to FIGS. 4-6, the spout coupler 24 illustratively includes a support or platform 62 coupled to upper ends 64 of the uprights 20 and 22. The support 62 illustratively includes a cylindrical wall 66 defining a receiving opening 69. Arcuate first and second fluid outlets 70 and 72 are formed within the cylindrical wall 66 and are in fluid communication with the first and second upright fluid channels 21 and 23. A spout mount 74 illustratively extends downwardly from the first end 25 of the spout arm 16. The spout mount 74 includes a cylindrical wall 76 supported for rotation within the receiving opening 69 of the support 62.

The illustrative spout coupler 24 further includes a spout fastener 78. The spout fastener 78, along with the support 62 and the spout mount 74, defines vertical opening 26. The spout fastener 78 secures the spout hub 14 to the spout arm 16, wherein external threads 80 of the spout fastener 78 engage with internal threads 82 of the spout mount 74.

With further reference to FIG. 5, the spout coupler 24 illustratively includes lower and upper glide rings 84 and 86 providing bearing surfaces to facilitate rotational movement of the spout arm 16 about the spout hub 14. The lower glide ring 84 is positioned intermediate a downwardly facing surface 90 of the support 62 and a flange 92 of the spout fastener 78. The upper glide ring 86 is positioned intermediate an upwardly facing surface 94 of the support 62 and a downwardly facing surface 96 of the spout arm 16 surrounding the cylindrical wall 76 of the spout mount 74. O-rings 98 and 100 are illustratively inserted between the cylindrical wall 66 of the support 62 of the spout hub 14 and the cylindrical wall 76 of the spout mount 74 to create a fluid-tight connection that also allows spout arm 16 to rotate between alternate positions A, B and C (FIG. 2). O-rings 98 and 100 fit into grooves 102 and 104, respectively, located circumferentially around spout mount 74.

An arcuate inlet 106 is formed within the cylindrical wall 76 of the spout mount 74. The o-rings 98 and 100 are illustratively positioned below and above the inlet 106, respectively. A fluid chamber 108 is defined by the spout mount 74 and is in fluid communication with the arm fluid channel 15 of the spout arm 16. As such, the upright fluid channels 21 and 23 are in fluid communication with arm fluid channel 15 through fluid coupling of the first and second fluid outlets 70 and 72 with the inlet 106.

Referring further to FIG. 5, when valves 30 and 32 (FIG. 1) are open and are fluidly coupled to faucet assembly 10, water or other fluid enters faucet assembly 10 through shank inlet 54, flow regulator 59, and into spout hub 14. Pressure from the flow of water or other fluid pushes the fluids into fluid channels 21 and 23 and up to the upper end 64 of the spout hub 14.

Referring to FIGS. 5-8, as fluid enters the spout coupler 24, pressure from the flow of the fluid pushes the fluid out of at least one of openings 70 or 72 and enters spout arm 16 through spout inlet 106. O-rings 98 and 100 prevent the leakage of fluid during the transfer of the fluid from spout hub 14 to spout arm 16. After the flow of water enters spout arm 16, the flow of water flows through the fluid channel 15, the flow device 60 and out of the outlet 17 of the faucet assembly 10.

Figure 9:
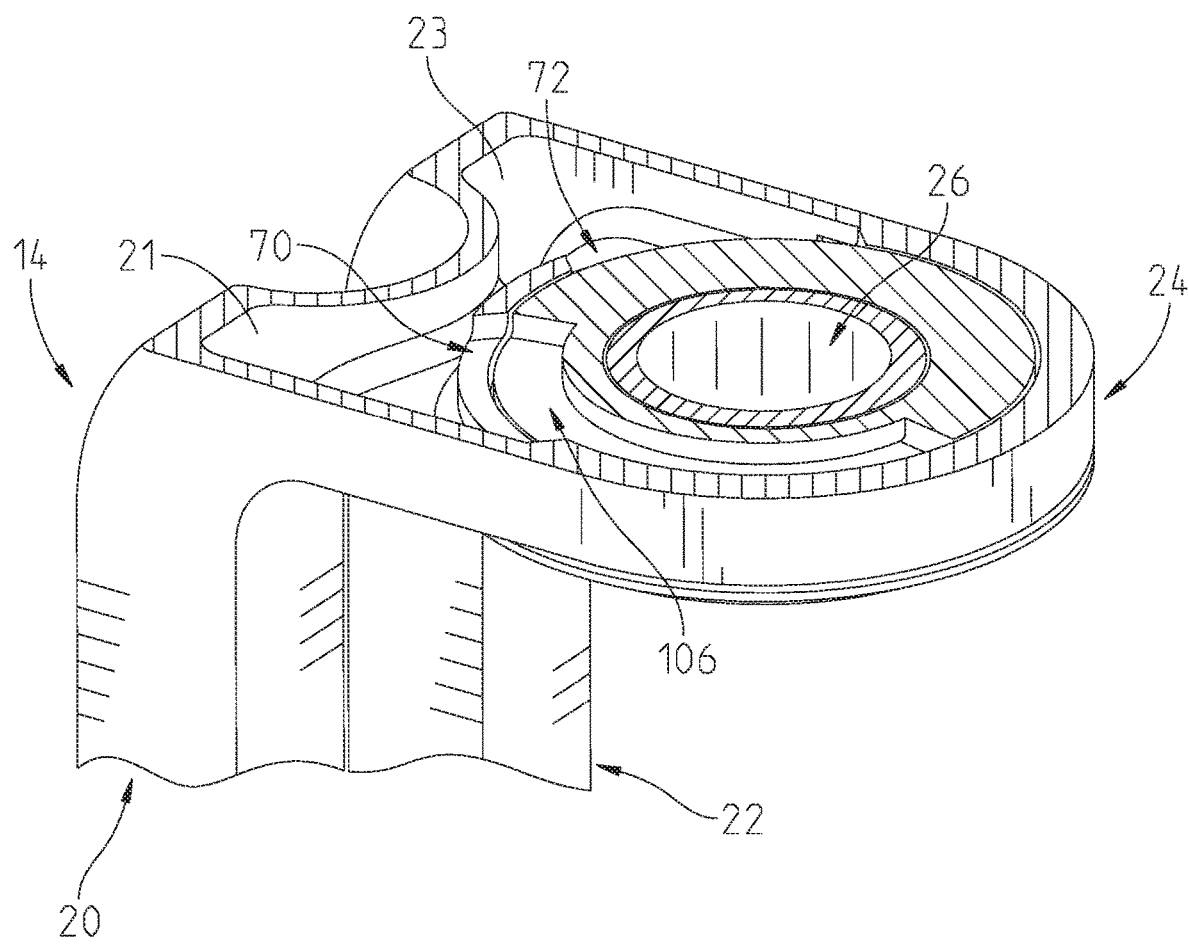
FIG. 9 is a cross-sectional view of the faucet assembly of FIG. 3, taken along line 9-9.

As shown in FIG. 9, in an illustrative embodiment outlets 70 and 72 are positioned within the interior of the spout coupler 24 of faucet body 14 so that inlet 106 is fluidly coupled with at least one of the outlets 70 and 72 while spout arm 16 is in alternate positions A, B or C (FIG. 2) or any position in between. In alternate embodiments, outlets 70 and 72 and/or inlet 106 can be placed in different relative positions around the interior of spout coupler 24 so that spout arm 16 is capable of rotating in other alternate positions while remaining fluidly coupled to faucet body 14.

Illustratively, the faucet assembly 10 (including, for example, the spout hub 14, the spout arm 16, and the spout coupler 24) is formed using additive manufacturing processes, such as three dimensional (3D) printing. For example, three dimensional printing illustratively uses digital three dimensional models (such as those created from scans or computer-assisted design software) to produce a three dimensional object through the creation of layers by a three dimensional printer. Several different three dimensional printing technologies are known, including selective laser sintering, fused deposition modeling, direct metal laser sintering, electron beam additive manufacturing technology, and stereolithography.

Many different materials can be used to create three dimensionally printed objects, including acrylonitrile butadiene styrene plastic, polylactic acid, polyamide, glass filled polyamide, epoxy resins, silver, titanium, steel, wax, photopolymers, polycarbonate, stainless steels, INCONEL, brass, bronze, and other materials that may be powder based. Where direct metal laser sintering is used with application-suitable corrosion resistant materials, non-sintered metallic powder can be removed with a stream of pressurized fluid, and internal channels treated with acid etching or abrasive slurries. Multimedia three dimensional printing is also known, so that in some embodiments, mixed metallic-plastic items may be fabricated.

Although the invention has been described in detail with reference to certain preferred embodiments, variations and modifications exist within the spirit and scope of the invention as described and defined in the following claims.

What is claimed is:

1. A faucet assembly comprising:
  a mounting base;
  a first upright extending upwardly from the mounting base and including a first upright fluid channel having a first outlet and configured to be fluidly coupled to a first water source;
  a second upright including a second upright fluid channel, the second upright being spaced apart from the first upright;
  a cantilevered spout arm including an arm fluid channel and extending between a first end and a second end, the first end supported by the first upright and the arm fluid channel including a fluid outlet proximate the second end; and
  a spout coupler including an inlet providing fluid communication between the first upright fluid channel of the first upright and the arm fluid channel of the cantilevered arm, the cantilevered arm supported for rotation relative to the first upright by the spout coupler.

2. The faucet assembly of claim 1, further comprising a mounting shank coupled to the mounting base for securing the mounting base to a sink deck.

3. The faucet assembly of claim 1, wherein:
  the spout coupler includes a support coupled to an upper end of the upright and including a cylindrical wall defining a receiving opening; and
  the cantilevered spout arm includes a downwardly extending spout mount rotatably supported within the receiving opening.

4. The faucet assembly of claim 3, wherein the spout mount includes a cylindrical wall defining a vertical opening extending through the support.

5. The faucet assembly of claim 4, wherein the cantilevered arm is rotatable about an axis of the vertical opening defined by the spout mount.

6. The faucet assembly of claim 3, wherein the spout mount includes a fluid chamber in fluid communication with the inlet, wherein the inlet is arcuate for rotation about a vertical axis.

7. The faucet assembly of claim 6, further comprising a first o-ring positioned below the inlet of the spout mount, and a second o-ring positioned above the inlet of the spout mount.

8. The faucet assembly of claim 1, wherein the second upright fluid channel is configured to be fluidly coupled to a second water source, the first water source being a hot water source, and the second water source being a cold water source.

9. The faucet assembly of claim 1, wherein the fluid outlet is defined by an aerator coupled to the cantilevered arm.

10. The faucet assembly of claim 1, wherein the first upright, the cantilevered spout arm and the spout coupler are formed via additive manufacturing.

11. A faucet assembly comprising:
  a mounting base;
  a first upright extending upwardly from the mounting base and including a first upright fluid channel having a first outlet;
  a second upright including a second upright fluid channel having a second outlet, the second upright spaced apart from the first upright;
  a cantilevered spout arm including an arm fluid channel and extending between a first end and a second end, the first end supported by the first upright and the second upright, and the arm fluid channel including a fluid outlet proximate the second end; and
  a spout coupler supporting the cantilevered spout arm for rotation relative to the first upright and the second upright.

12. The faucet assembly of claim 11, further comprising a mounting shank coupled to the mounting base for securing the mounting base to a sink deck.

13. The faucet assembly of claim 11, wherein the spout coupler includes an inlet providing fluid communication between the first upright fluid channel of the first upright, the second upright fluid channel of the second upright, and the arm fluid channel of the cantilevered arm.

14. The faucet assembly of claim 13, wherein:
  the spout coupler includes a support coupled to an upper end of the first upright and an upper end of the second upright, the spout coupler including a cylindrical wall defining a receiving opening; and
  the cantilevered spout arm includes a downwardly extending spout mount rotatably supported within the receiving opening.

15. The faucet assembly of claim 14, wherein the spout mount includes an inlet and a cylindrical wall defining a vertical opening.

16. The faucet assembly of claim 15, wherein the cantilevered arm is rotatable about an axis of the vertical opening defined by the spout mount.

17. The faucet assembly of claim 15, wherein the spout mount includes a fluid chamber in fluid communication with the inlet, wherein the inlet is arcuate for rotation about a vertical axis.

18. The faucet assembly of claim 17, further comprising a first o-ring positioned below the inlet of the spout mount, and a second o-ring positioned above the inlet of the spout mount.

19. The faucet assembly of claim 11, wherein the fluid outlet is defined by an aerator coupled to the cantilevered arm.

20. The faucet assembly of claim 11, wherein the first upright, the second upright, the cantilevered spout arm and the spout coupler are formed via additive manufacturing.

21. A faucet assembly comprising:
- a mounting shank configured to be mounted to a sink deck; and
- a faucet body coupled to the mounting shank, the faucet body including:
  - a spout hub including a support having a cylindrical wall defining a receiving opening with at least one outlet within the cylindrical wall;
  - the spout hub including a first upright and a second upright spaced apart from the first upright;
  - the at least one fluid channel including a first fluid channel defined by the first upright, and a second fluid channel defined by the second upright; and
  - the at least one outlet including a first outlet in fluid communication with the first fluid channel, and a second outlet in fluid communication with the second fluid channel;
  - a mounting base coupled to the mounting shank and the spout hub; and
  - at least one fluid channel defined by the spout hub and in fluid communication with the at least one outlet of the spout hub; and
  - a spout arm operably coupled to the spout hub;
  - a spout mount rotatably coupled to the support of the spout hub, the spout mount having an inlet configured to be in fluid communication with the at least one outlet of the spout hub;
  - a fluid channel defined by the spout arm and fluidly coupled to the inlet of the spout mount; and
  - an outlet defined by the spout arm and fluidly coupled to the fluid channel of the spout arm;
  - wherein the spout arm is configured to rotate relative to the spout hub between a plurality of alternate positions.

22. The faucet assembly of claim 21, wherein the spout arm rotates between different angular positions about an axis defined by the receiving opening of the spout hub.

23. The faucet assembly of claim 21, wherein the spout hub includes a plurality of outlets within the cylindrical wall.

24. The faucet assembly of claim 21, further comprising a first o-ring positioned below the inlet of the spout mount, and a second o-ring positioned above the inlet of the spout mount.

25. The faucet assembly of claim 21, wherein the spout mount includes a fluid chamber in fluid communication with the inlet, wherein the inlet is arcuate for rotation about a vertical axis.

26. The faucet assembly of claim 21, wherein the faucet body is formed via additive manufacturing.

* * * * *